US 6,539,238 B1

(12) United States Patent
Brouns et al.

(10) Patent No.: US 6,539,238 B1
(45) Date of Patent: Mar. 25, 2003

(54) FALL THROUGH TELEPHONE DIRECTORY

(75) Inventors: Dirk Brouns, Kinrooi (BE); Michel Diane Cyriel Van Ackere, Sint-Niklaas (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/453,946

(22) Filed: May 25, 2000

(30) Foreign Application Priority Data

Jun. 2, 1999 (EP) ............................................. 99401326

(51) Int. Cl.$^7$ ................................................. G06K 7/00
(52) U.S. Cl. ........................ 455/558; 455/555; 455/564; 455/414; 379/88.02; 379/218.01
(58) Field of Search ................................ 455/558, 564, 455/414, 551, 555; 379/88.01, 88.02, 88.03, 88.04, 218.01

(56) References Cited

U.S. PATENT DOCUMENTS

| 4,734,931 | A |   | 3/1988  | Bourg et al. |              |
|-----------|---|---|---------|--------------|--------------|
| 5,204,894 | A |   | 4/1993  | Darden       |              |
| 5,483,586 | A |   | 1/1996  | Sussman      |              |
| 5,598,458 | A | * | 1/1997  | Bales et al. | ......... 379/219 |
| 5,930,703 | A | * | 7/1999  | Cairns       | ......... 379/355.06 |
| 6,125,287 | A | * | 9/2000  | Cushman et al. | ........ 455/412 |
| 6,185,295 | B1 | * | 2/2001  | Frederiksen et al. | ... 379/355.05 |
| 6,223,057 | B1 | * | 4/2001  | Sone         | ........ 379/354 |
| 6,278,885 | B1 | * | 8/2001  | Hubbe et al. | ........ 455/458 |
| 6,289,226 | B1 | * | 9/2001  | Levken et al. | ......... 705/7 |
| 6,339,710 | B1 | * | 1/2002  | Suzuki       | ......... 340/7.52 |
| 6,353,736 | B1 | * | 3/2002  | Hiromichi    | ........ 455/406 |
| 6,370,374 | B1 | * | 4/2002  | Eichinger et al. | ........ 455/411 |
| 6,415,164 | B1 | * | 7/2002  | Blanchard et al. | ..... 379/387.01 |
| 2001/0041560 | A1 | * | 11/2001 | Tarkiainen et al. | ........ 455/414 |
| 2001/0053690 | A1 | * | 12/2001 | Inoue        | ........ 455/415 |

FOREIGN PATENT DOCUMENTS

GB       2 264 611 A       9/1993

\* cited by examiner

Primary Examiner—Edward F. Urban
Assistant Examiner—Khawar Iqbal
(74) Attorney, Agent, or Firm—Sughrue Mion, PLLC

(57) ABSTRACT

A telecommunication user terminal, such as a traditional telephone set or a mobile telephone, provided with a personal address book or internal database (PTD), e.g. located on a user's smart-card. The internal database has several memory locations (IA1, ..., IA5, ...) each storing a call reference that may be selected as calling number by a search key entered by the user on a keyboard (KB) of the telephone. The internal database further has an extra memory location (XE) that stores an extra call reference to a second database (TDS) and that is used in case no matching is found with the other call references. The second database is an external directory service controlled by an operator or service provider. The internal and external database complement one another in a transparent way for the user owing to a fall-through selection circuit (FT) also forming part of the telephone.

6 Claims, 4 Drawing Sheets

FALL THROUGH TELEPHONE DIRECTORY

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

1. Description of Related Art

Not Applicable

2. Field of the Invention

The present invention relates to a telecommunication user terminal including a database with a plurality of memory locations each adapted to store a call reference, said user terminal further including selection means adapted to select one of said memory locations according to a predetermined input in said user terminal and to allow a connection to be setup according to the selected call reference.

Such a telecommunication user terminal is generally known in the art. It may for instance be a typical telephone subscriber set or, preferably, a mobile telephone. The database of the user terminal is a personal telephone directory and the call references are phone numbers. Each of these phone numbers is a translation of the code, abbreviation or name dialed on the keyboard of the terminal as predetermined input. In case of a mobile telephone, the database or personal telephone directory is loaded on a smart-card inserted in the telephone. This user personal telephone directory may be combined with another personal telephone directory internal to the telephone, forming then also part of the database. This internal personal telephone directory is in fact the only one present in a fixed telephone.

When one or more alphanumeric characters are entered (dialed) in the telecommunication user terminal or after a "select" instruction, the selection means scans the database or personal telephone directory in order to find a memory location corresponding to this input. If found, the call reference contained in the pointed memory location is transmitted to the selection means. This allows the telecommunication user terminal to setup a connection to a subscriber or to an address corresponding to the selected call reference.

A problem with a database included in a telecommunication user terminal is that the amount of entries thereof is generally limited. Also the size of the memory locations is predefined and may not be exceeded. Additionally, the call references of the database have generally to be loaded and updated manually by the user. To search for information on other telephone services, e.g. in different address books or databases such as the ones provided by network operators or service providers, a special call to these services has to be setup with the goal of searching the information therein. This requires the knowledge of the references or addresses of these services in order to call them up.

SUMMARY OF THE INVENTION

An object of the present invention is to provide a telecommunication user terminal of the above known type but which has an easy and user friendly access to a database that is relatively much larger than the one included in the known telecommunication user terminal.

According to the invention, this object is achieved due to the fact that said database includes an extra memory location adapted to store an extra call reference to a second database, said second database being external to said telecommunication user terminal and including second memory locations each adapted to store a second call reference, and that said telecommunication user terminal further includes fall-through selection means adapted to couple said selection means to said second database in order to select one of said second memory locations according to said predetermined input and to allow a connection to be setup according to the selected second call reference.

In this way, the user is provided with an easy access mechanism to a global directory service. By adding only one extra memory location, the amount of possible memory locations to select is increased by the size of the second database. Since the second database is external to the user terminal, it may be relatively much larger. Also larger (second) call references may be available. As a result, the user has an automatic and transparent access to a very large virtual database, e.g. the telephone directory service provided by a network operator. Moreover, no additional action has to be taken by the user to switch from his user and/or internal personal directory or database to the external second database when an entry, for which the user is searching, is not found in the first database.

In more detail, the present invention is characterized in that said fall-through selection means establishes a connection between said telecommunication user terminal and said second database according to said extra call reference and is adapted to recover the selected second call reference and to transmit it to said selection means.

In this way, the user has not even to know the reference for calling the second

Further characteristic features of the present telecommunication set are mentioned in the appended claims.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
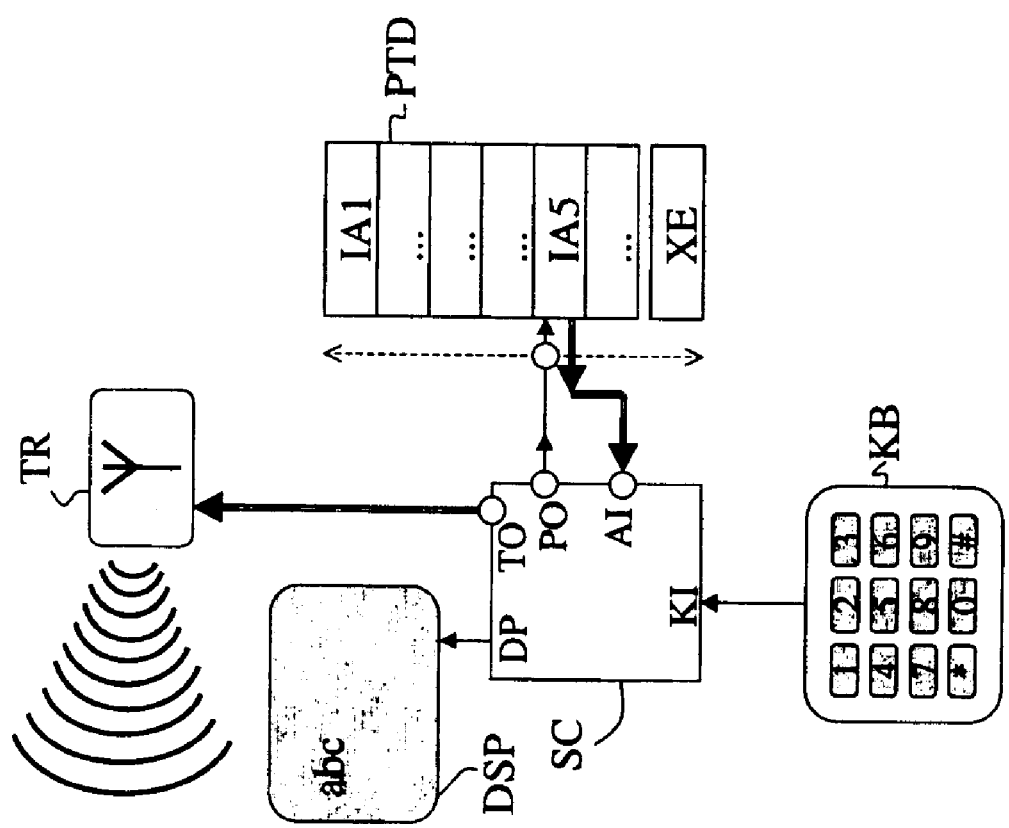
FIG. 1 schematically represents a common operation of a telecommunication user terminal with an internal database PTD according to the invention.
Figure 2:
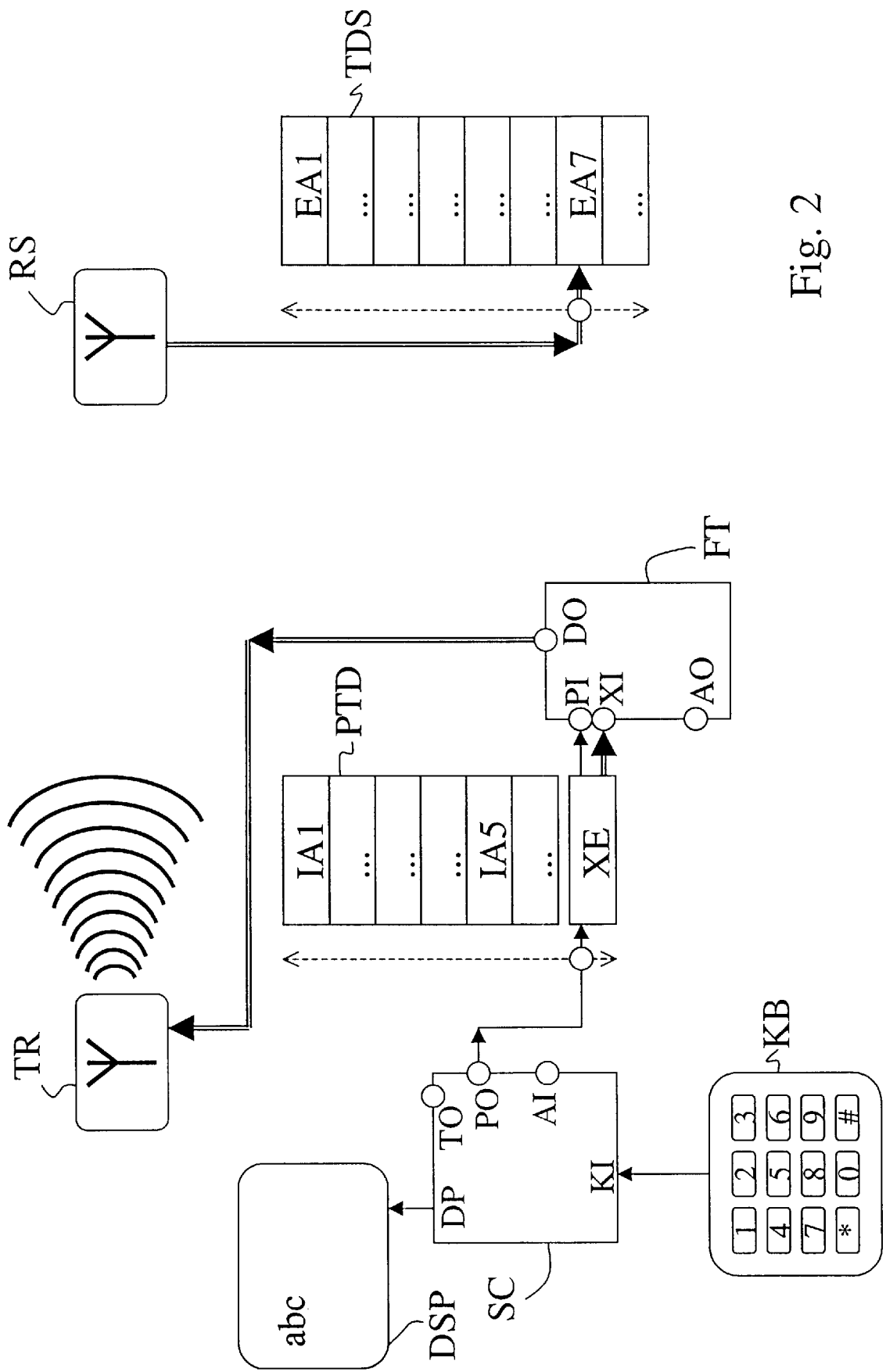
FIGS. 2 to 4 represent successive steps of an operation of the user terminal of FIG. 1 for recovering a call reference from an external database TDS.

The block diagram shown at FIG. 1 schematically represents circuits of a telecommunication user terminal such as for instance a traditional telephone subscriber set or a mobile telephone, as will be described in more detail in the following example. The telephone has an input keyboard KB and a display DSP showing the alphanumeric characters, i.e. characters or digits, entered by a user on the keyboard KB. The telephone is further provided with a database PTD that is generally implemented as personal telephone directory or address book of the user. The database PTD forms part either of the terminal itself or of a smart-card that may be inserted in the terminal. In case of a mobile telephone, the database PTD is generally constituted by a combination of these two types of memories that operate individually or that complement one another in a transparent way. Since the database PTD is internal to the telephone, its size is rather limited. Therefore, the telecommunication user terminal or telephone of the present invention is provided with a fall-through selection circuit FT, as shown at FIG. 2. As will be explained in more detail later, the fall-through selection circuit FT allows to establish a link to an external database TDS in case the searched item is not found in the internal database PTD.

The operation of the telecommunication user terminal using the internal database PTD as well as the external database TDS will be explained hereafter.

When the user is searching for a reference in a database, he enters a name, an abbreviation or a code, e.g. "abc", as search key or input on the keyboard KB. This information is transmitted from KB to an input KI of a selection circuit SC, also included in the telephone, as shown at FIG. 1. The selection circuit SC sends the search key both to the display DSP via an output DP and to the internal database PTD as a pointer PO via a like-named output. The pointer PO scans the internal database PTD in order to find therein a memory location IA1, . . . , IA5, . . . that contains a call reference corresponding to the search key. If such a call reference is found, say IA5 having here the same name as the corresponding memory location, it is transferred to an input AI of the selection circuit SC. The call reference IA5 is generally a calling number of a person whose name or any other reference has been entered as input on the keyboard KB and it can thus be used as such for calling this person. To this end, the call reference IA5 is transmitted via an output TO of SC towards an output circuit TR of the telephone, and so further to a telephone exchange (not shown). In case of a traditional telephone, the output circuit TR is coupled to a wall connector of the subscriber set, whilst in case of a mobile telephone the output circuit TR is the transmission circuit coupled to the antenna. The output circuit TR will however not be described in more detail hereafter because it is well known by any person skilled in the art.

In case no matching call reference is found in the memory locations IA1, . . . , IA5, . . . of the database PTD, the pointer PO drops automatically to an extra memory location XE of this database PTD. As shown at FIG. 2, the contains XE of the like-named extra memory location is then transferred to an input XI of a fall-through selection circuit FT, also included in the telephone. The pointer PO itself is also transferred to the fall-through selection circuit FT via an input PI thereof. The fall-through selection circuit FT uses the call reference XE as calling number for an external database TDS by providing it to the output circuit TR of the telephone via an output DO of FT. The external database TDS includes memory locations EA1, . . . , EA7, . . . and is coupled to a transmitter/receiver circuit RS similar to the output circuit TR of the telephone. The external database TDS operates in a similar as the internal database PTD but may be much larger since it is external to the telephone. TDS provides an enhanced telephone directory service controlled by a network operator or a service provider.

Figure 3:
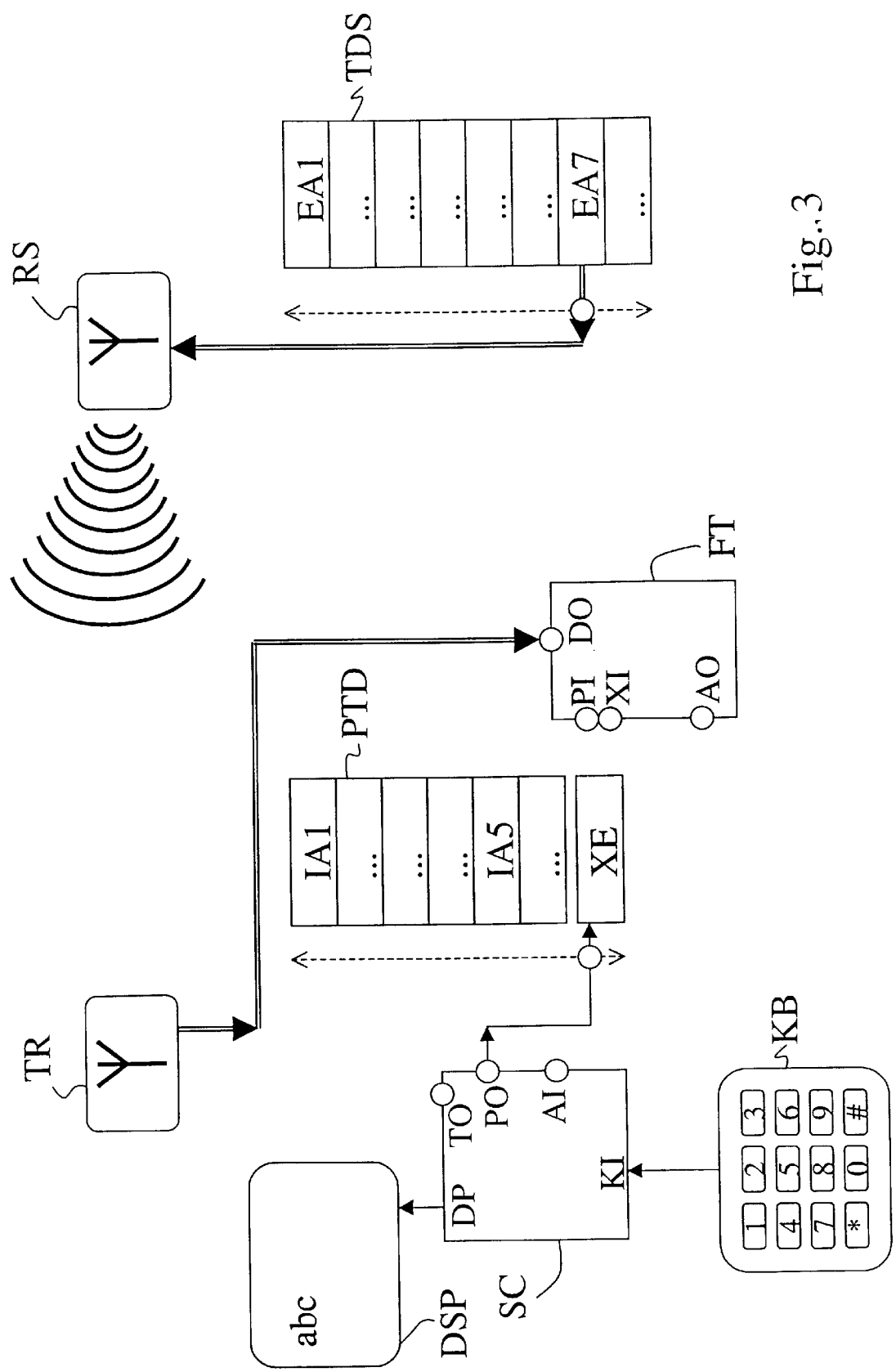

When a communication is established between the circuits TR and RS, the pointer PO is transferred to the external database TDS where it is again used as a pointer for scanning the memory locations EA1, . . . , EA7, . . . When a call reference matching the pointer PO is found, say EA7 having here the same name as the corresponding memory location, it is transferred to the transmitter/receiver circuit RS, as shown at FIG. 3. From RS, the call reference EA7 is transmitted to the fall-through selection circuit FT via the output circuit TR of the telephone and an input DO of FT.

Figure 4:
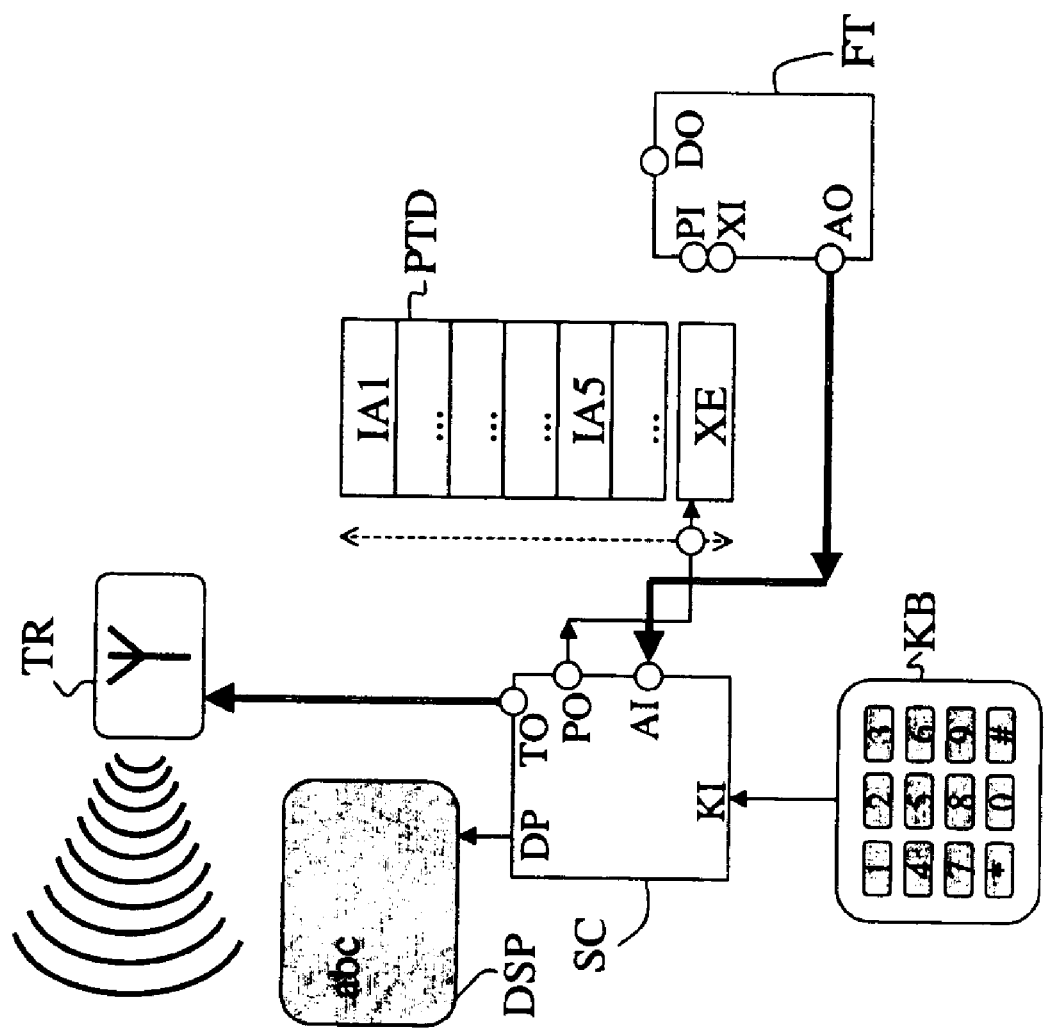

Referring now to FIG. 4, the call reference EA7 is further transferred via an output AO of the fall-through selection circuit FT to the input Al of the selection circuit SC. From the input AI, the call reference EA7 is transmitted as calling number to the output TO of SC towards the output circuit TR of the telephone and so further to a telephone exchange as already mentioned above.

The above operations provide the user with an option to automatically contact an external directory service when no matching is found for a search key in his internal or personal address book.

Additionally, because of the clear separation between the internal address book and the external directory service, an adaptation or insertion of a new entry can be left open to the user or can be done automatically by the operator or service provider himself. This may for instance be done through the connection mentioned above between the circuits RS and TR.

Other enhancements are also possible. For example, if the retrieved call reference EA7 of the external database TDS is represented in a predetermined format, the telecommunication user terminal can take appropriate actions to store/cache it in its internal database PTD without any user intervention. These actions could be performed by the inter-operation of the fall-through selection circuit FT and the selection circuit SC, or by any other circuit not shown here. In the long run, this will increase the chance of finding a correct call reference in the personal address book or internal database PTD and therefore limiting the amount of hits on the external directory service or database TDS. This is particularly useful in case the user has to pay on a per-search basis. In this case, it is likely that the service can't be made that transparent as described above. The user then probably wants to know how many times he actually contacted the external directory service TDS to find out how much he will have to pay for it.

While the principles of the invention have been described above in connection with specific apparatus, it is to be clearly understood that this description is made only by way of example and not as a limitation on the scope of the invention, as defined in the appended claims.

DEPOSIT OF COMPUTER PROGRAM LISTINGS

Not applicable

What is claimed is:

1. A telecommunication user terminal including:

a first database with a plurality of memory locations, each adapted to store a call reference;

selection means adapted to select one of said memory locations according to a predetermined input in said user terminal and to allow a connection to be setup according to the selected call reference, said first database including an extra memory location adapted to store an extra call reference to a second database, said second database being external to said telecommunication user terminal and including second memory locations, each adapted to store a second call reference; and fall-through selection means adapted to couple said selection means to said second database to select one of said second memory locations according to said predetermined input, and to allow a connection to be setup according to the selected second call reference.

2. The telecommunication user terminal according to claim 1, wherein said telecommunication user terminal is a mobile telephone and the first database is a user personal telephone directory loaded on a smart-card inserted in said mobile telephone.

3. The telecommunication user terminal according to claim 1, wherein the first database includes the internal personal telephone directory of said telecommunication user terminal.

4. The telecommunication user terminal according to claim 1, wherein said fall-through selection means establishes a connection between said telecommunication user terminal and said second database according to said extra call reference, and is adapted to recover the selected second call reference and to transmit said selected second call reference to said selection means.

5. The telecommunications user terminal of claim 4, wherein said selected second call reference is transferred directly to said selection means without passing through said extra memory location.

6. The telecommunications user terminal of claim 1, wherein said coupling is performed by a pointer that points from said selection means to said first database, from said first database to said fall-through selection means, and from said fall-through selection means to said second database.

* * * * *